US012637072B2

(12) United States Patent
    Hiraiwa

(10) Patent No.:    US 12,637,072 B2
(45) Date of Patent:        May 26, 2026

(54) DRIVER ASSISTANCE DEVICE AND DRIVER ASSISTANCE METHOD FOR VEHICLE

(71) Applicant: TOYOTA JIDOSHA KABUSHIKI KAISHA, Toyota (JP)

(72) Inventor: Yuta Hiraiwa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 37 days.

(21) Appl. No.: 18/743,102

(22) Filed: Jun. 14, 2024

(65) Prior Publication Data

US 2025/0121821 A1      Apr. 17, 2025

(30) Foreign Application Priority Data

Oct. 16, 2023    (JP) ................................. 2023-177980

(51) Int. Cl.
    *B60W 40/08*            (2012.01)
    *B60W 30/09*            (2012.01)
                    (Continued)
(52) U.S. Cl.
    CPC ........  *B60W 30/0956* (2013.01); *B60W 30/09* (2013.01); *B60W 40/08* (2013.01);
                    (Continued)
(58) Field of Classification Search
    CPC .. B60W 30/0956; B60W 30/09; B60W 40/08; B60W 50/14; B60W 2540/225;
                    (Continued)

(56) References Cited

U.S. PATENT DOCUMENTS 5,072,966  A  *  12/1991  Nishitake ................ B60R 21/21
                                                180/274
9,105,190  B2      8/2015  Akiyama
                    (Continued)

FOREIGN PATENT DOCUMENTS

JP        2007-072631  A      3/2007
JP        2012-058827  A      3/2012
                    (Continued)

*Primary Examiner* — Daniel M. Robert
(74) *Attorney, Agent, or Firm* — SoraIP, Inc.

(57)                ABSTRACT

The driver assist ECU determines whether there is another vehicle on the collision course based on the other vehicle information. ECU determines whether a predetermined execution condition for executing the collision avoidance assist operation is satisfied when it is determined that there are other vehicles on the collision course, and starts executing the collision avoidance assist operation when it is determined that the execution condition is satisfied. ECU changes the execution condition based on an approaching direction determination result as to whether the other vehicle on the collision course is approaching from the direction of the driver's seat of the host vehicle or is approaching from the direction on the passenger seat of the host vehicle, and a visual perception determination result as to whether the probability that the driver of the host vehicle has visually perceived the other vehicle on the collision course is high.

1 Claim, 6 Drawing Sheets

(51) Int. Cl.
    *B60W 30/095*     (2012.01)
    *B60W 50/14*     (2020.01)

(52) U.S. Cl.
    CPC ....... *B60W 50/14* (2013.01); *B60W 2540/225* (2020.02); *B60W 2554/4044* (2020.02)

(58) Field of Classification Search
    CPC ... B60W 2554/4044; B60W 2554/802; B60W 30/095; B60W 30/0953; B60W 40/02; B60W 50/0097; B60W 50/0098; B60W 2554/80
    See application file for complete search history.

(56)         References Cited

U.S. PATENT DOCUMENTS

| | | | |
|---|---|---|---|
| 9,393,960 B2 | 7/2016 | Kodaira | |
| 9,483,945 B2 * | 11/2016 | Okita | G08G 1/166 |
| 9,873,412 B2 * | 1/2018 | Moriizumi | B60T 7/22 |
| 10,793,147 B2 | 10/2020 | Kaminade et al. | |
| 2011/0169625 A1 * | 7/2011 | James | B60W 30/095 |
| | | | 340/439 |
| 2013/0162794 A1 | 6/2013 | Wakiyama | |
| 2017/0291602 A1 * | 10/2017 | Newman | B60W 50/16 |
| 2019/0135295 A1 | 5/2019 | Sato et al. | |
| 2021/0061309 A1 | 3/2021 | Kawanai | |
| 2021/0107521 A1 | 4/2021 | Fujita et al. | |
| 2021/0107528 A1 | 4/2021 | Fujita et al. | |
| 2021/0146956 A1 | 5/2021 | Fujita et al. | |
| 2021/0146958 A1 * | 5/2021 | Tanaka | B60W 60/0016 |

FOREIGN PATENT DOCUMENTS

| | | | |
|---|---|---|---|
| JP | 2013-152700 A | 8/2013 | |
| JP | 2016-038866 A | 3/2016 | |
| JP | 2018-173716 A | 11/2018 | |
| JP | 2018-206210 A | 12/2018 | |
| JP | 2019-087029 A | 6/2019 | |
| JP | 2019-087143 A | 6/2019 | |
| JP | 2021-104742 A | 7/2021 | |

* cited by examiner

FIG. 5

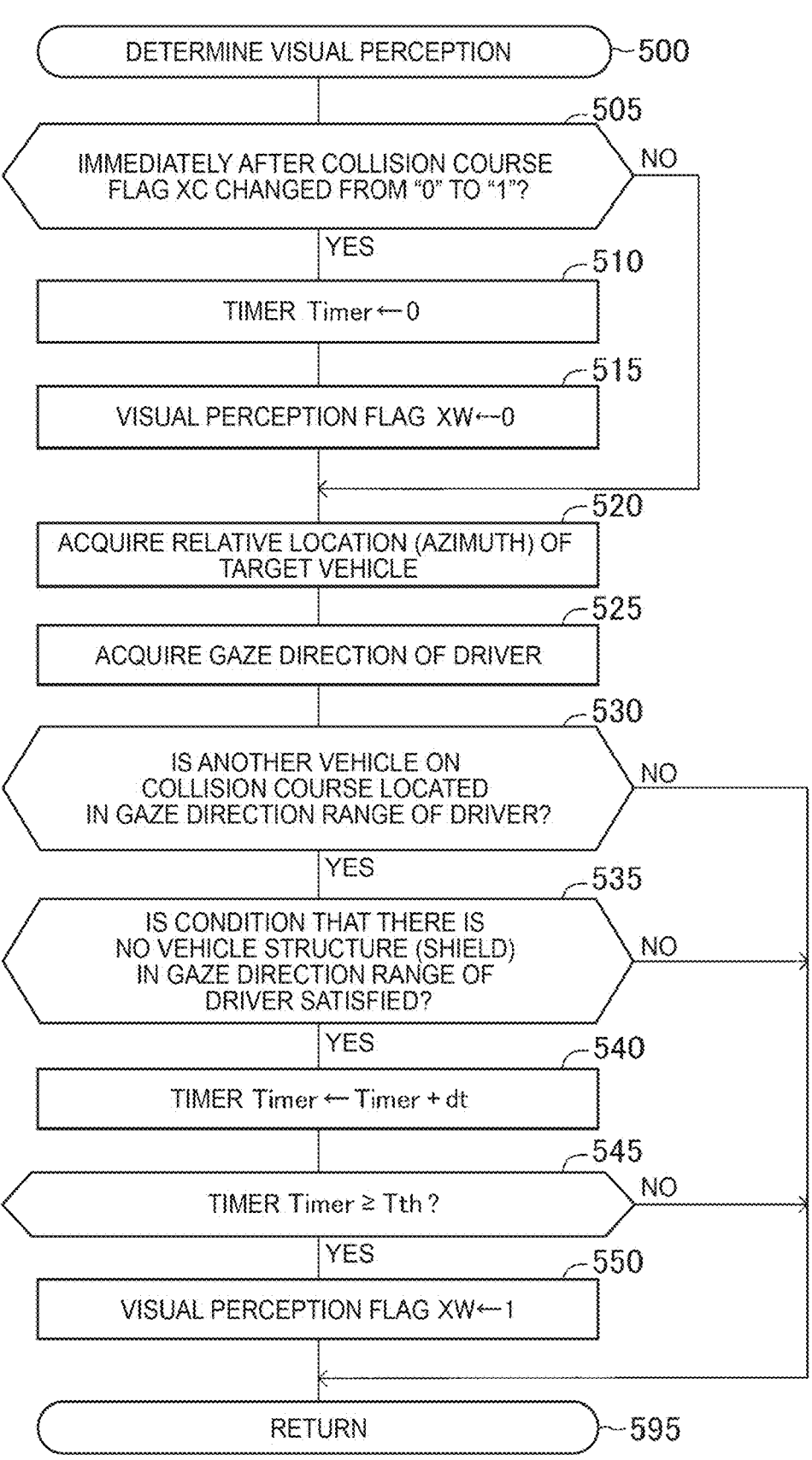

DETERMINE VISUAL PERCEPTION ~500

IMMEDIATELY AFTER COLLISION COURSE FLAG XC CHANGED FROM "0" TO "1"? —505 NO

YES

TIMER Timer ← 0 —510

VISUAL PERCEPTION FLAG XW ← 0 —515

ACQUIRE RELATIVE LOCATION (AZIMUTH) OF TARGET VEHICLE —520

ACQUIRE GAZE DIRECTION OF DRIVER —525

IS ANOTHER VEHICLE ON COLLISION COURSE LOCATED IN GAZE DIRECTION RANGE OF DRIVER? —530 NO

YES

IS CONDITION THAT THERE IS NO VEHICLE STRUCTURE (SHIELD) IN GAZE DIRECTION RANGE OF DRIVER SATISFIED? —535 NO

YES

TIMER Timer ← Timer + dt —540

TIMER Timer ≥ Tth ? —545 NO

YES

VISUAL PERCEPTION FLAG XW ← 1 —550

RETURN ~595

DRIVER ASSISTANCE DEVICE AND DRIVER ASSISTANCE METHOD FOR VEHICLE

CROSS-REFERENCE TO RELATED APPLICATION

This application claims priority to Japanese Patent Application No. 2023-177980 filed on Oct. 16, 2023, incorporated herein by reference in its entirety.

BACKGROUND

1. Technical Field

The present disclosure relates to driver assistance devices and driver assistance methods for vehicles that can reduce the possibility of a collision between a host vehicle and another vehicle due to a phenomenon called "constant bearing, decreasing range."

2. Description of Related Art

Conventionally, devices are known that, when a time point at which a driver of a host vehicle perceives "another vehicle that is highly likely to collide with the host vehicle (another vehicle on a collision course)" is delayed due to the constant bearing, decreasing range phenomenon, detect such another vehicle and execute a collision avoidance assist operation at a predetermined timing (see, for example, Japanese Unexamined Patent Application Publication Nos. 2012-58827 (JP 2012-58827 A) and 2018-206210 (JP 2018-206210 A)). The collision avoidance assist operation is, for example, an automatic braking operation.

SUMMARY

However, the conventional devices may execute the collision avoidance assist operation even when the driver has perceived another vehicle on a collision course. This makes the driver feel that the collision avoidance assist operation is unnecessary or makes the driver doubt about the collision avoidance assist operation.

The present disclosure was made to address such an issue. That is, one object of the present disclosure is to provide a driver assistance device for a vehicle that can execute at a more appropriate timing a collision avoidance assist operation for avoiding a collision between a host vehicle and another vehicle on a collision course.

A driver assistance device for a vehicle according to an aspect of the present disclosure (hereinafter also referred to as the "device of the present disclosure") includes a controller configured to: acquire another vehicle information that is information on a location of another vehicle with respect to a host vehicle, the other vehicle being another vehicle present in a region located diagonally in front of the host vehicle; when determination is made based on the another vehicle information that there is another vehicle on a collision course, determine whether an executing condition for executing a collision avoidance assist operation for avoiding a collision between the host vehicle and the other vehicle on the collision course is satisfied, the other vehicle on the collision course being another vehicle traveling in such a manner that a constant bearing, decreasing range phenomenon occurs for the host vehicle; and when determination is made that the execution condition is satisfied, start execution of the collision avoidance assist operation.

The controller is configured to change the execution condition based on either or both of an approaching direction determination result as to whether the other vehicle on the collision course is approaching from a direction of a driver's seat of the host vehicle or is approaching from a direction of a passenger's seat of the host vehicle, and a visual perception determination result as to whether a probability that a driver of the host vehicle has visually perceived the other vehicle on the collision course is high.

The field of view of the driver of the host vehicle in a diagonally forward direction varies greatly depending on whether large part of a vehicle structure (e.g., an A-pillar) is in that field of view. That is, the driver's field of view in a diagonally forward direction varies greatly depending on whether the other vehicle on the collision course is approaching from the direction of the driver's seat or is approaching from the direction of the passenger's seat. Therefore, whether the driver is able to visually perceive the other vehicle on the collision course also varies depending on the direction from which the other vehicle on the collision course is approaching. Accordingly, changing the execution condition according to the approaching direction determination result allows a collision avoidance driving operation to be started at a more appropriate timing.

Moreover, changing the execution condition according to the visual perception determination result as to whether the driver has visually perceived the other vehicle on the collision course allows the collision avoidance driving operation to be started at a more appropriate timing.

In the above description, for better understanding of the present disclosure, the names and/or signs used in an embodiment described below are added in parentheses in order to indicate correspondence between the configurations of the present disclosure and the configurations of the embodiment. However, the components of the present disclosure are not limited to those of the embodiment defined by the names and/or signs. The present disclosure also provides a driver assistance method for a vehicle and a program thereof.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a routine executed by CPU of the driver assist ECU shown in FIG. 1;

DETAILED DESCRIPTION OF EMBODIMENTS

Figure 1:
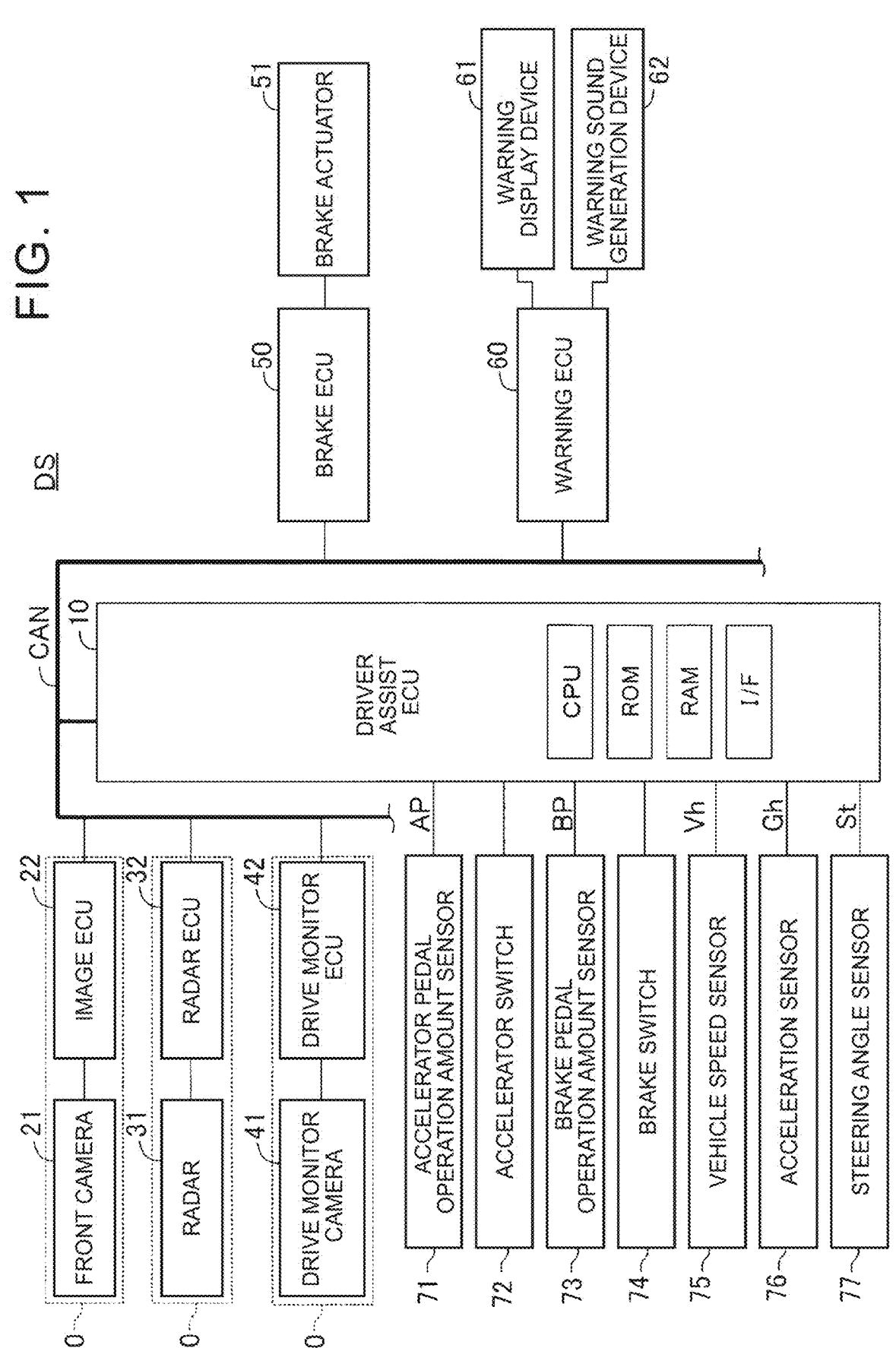
FIG. 1 is a schematic configuration diagram of a driver assistance device for a vehicle according to an embodiment of the present disclosure.

A driver assistance device DS for a vehicle (hereinafter, referred to as "device DS") according to an embodiment of the present disclosure includes the components illustrated in FIG. 1, and is applied to (mounted on) the host vehicle. The host vehicle may be any of a vehicle using an internal combustion engine as a power source, a vehicle using an electric motor as a power source, a hybrid electric vehicle, and the like.

As used herein, a "ECU" is an electronic control unit that includes a microcomputer including a CPU (processor), a ROM, RAM, interfaces, and the like. ECU are also referred to as controllers or computers. The plurality of ECU shown in FIG. 1 are connected to each other through a Controller Area Network (CAN) so as to be able to exchange information. Some or all of these ECU may be integrated into one ECU.

Figure 2:
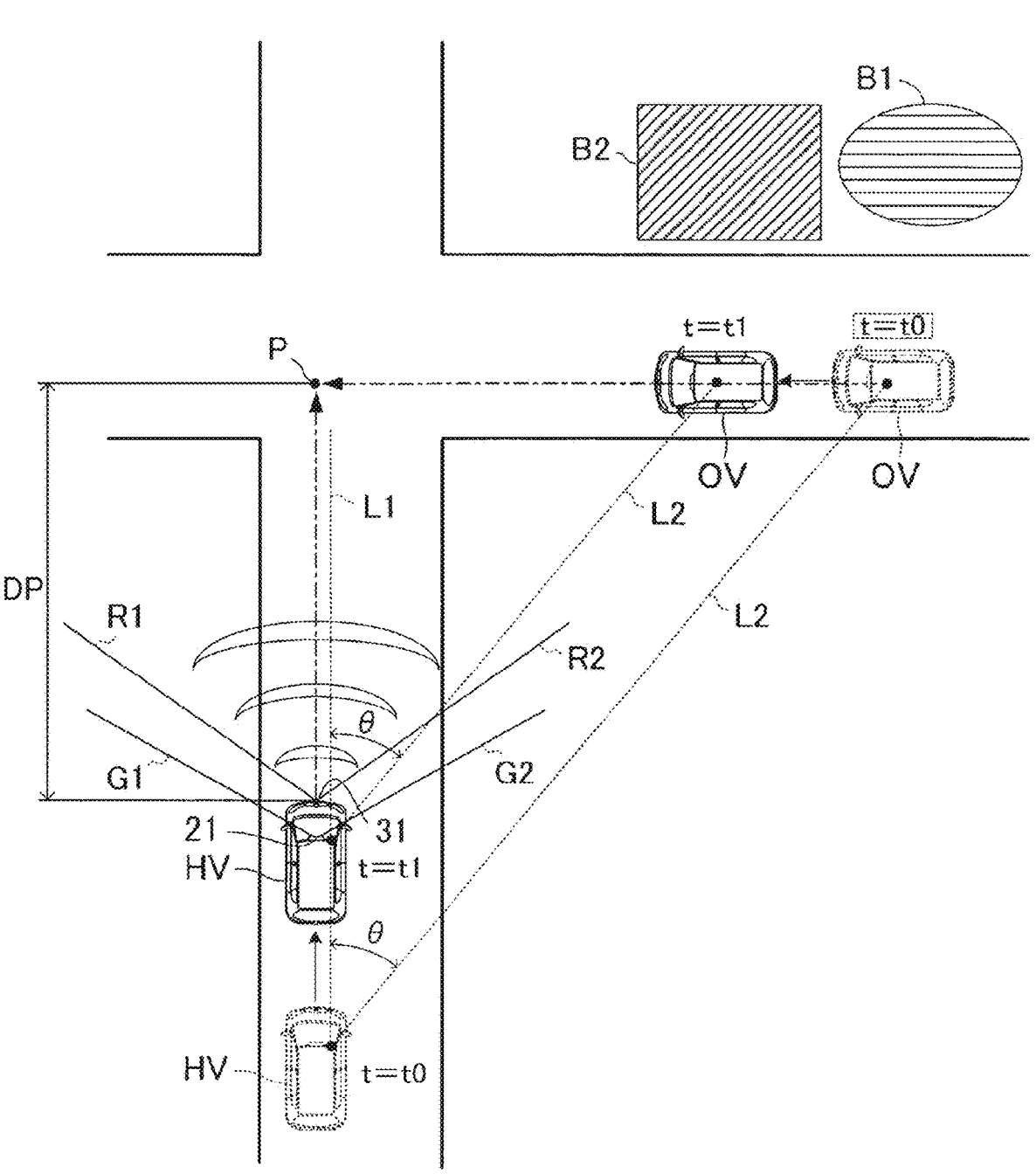
FIG. 2 is a diagram illustrating a constant bearing, decreasing range phenomenon.

As will be described in detail later, the driver assist ECU 10 executes "collision avoidance control/collision damage mitigation control" as the driver assist control when there are "other vehicles on the collision course". The "another vehicle on the collision course" is "another vehicle that is hard for the driver of the host vehicle to perceive to be another vehicle that is highly likely to collide with the host vehicle" due to the constant bearing, decreasing range phenomenon. As illustrated in FIG. 2, the constant bearing, decreasing range phenomenon is a phenomenon in which the driver of the host vehicle HV erroneously perceives another vehicle OV as if it were stationary. The constant bearing, decreasing range phenomenon occurs because both the host vehicle HV and another vehicle OV perform constant velocity linear motion toward the intersection point P, and the angle θ formed between the linear L1 parallel to the front-rear axis of the host vehicle HV and the linear L2 passing through the driver of the host vehicle and the another vehicle OV is maintained at a substantially constant angle. When the constant bearing, decreasing range phenomenon occurs, the driver of the host vehicle HV does not execute the collision avoidance driving maneuver, or the execution of the collision avoidance driving maneuver is delayed.

Referring back to FIG. 1, the front camera device 20 includes a front camera 21 and an image ECU 22. The front camera 21 has an angle of view in the left-right direction indicated by the straight line G1 and the straight line G2 in FIG. 2, and captures a scene in the forward direction and the obliquely forward direction of the host vehicle every time a predetermined period of time elapses to acquire image data. The image ECU 22 generates camera information by analyzing the image data from the front camera 21, and transmits the camera information to the driver assist ECU 10. The camera information includes information such as the image data itself and the "position, relative longitudinal speed, relative lateral speed, and type" of the captured target object with respect to the host vehicle. Therefore, the camera information includes the another vehicle information that specifies the location of the other vehicle with respect to the host vehicle, which is located in the obliquely forward region of the host vehicle.

The radar device 30 is a well-known device that acquires information about a target object existing in a forward direction and an obliquely forward direction of the host vehicle by using a millimeter-wave band radio wave, and includes a radar 31 and a radar ECU 32. Each time a predetermined period elapses, the radar 31 transmits millimeter waves within the detection area indicated by the linear R1 and the linear R2 in FIG. 2, and receives millimeter waves reflected by the target object. The radar 31 transmits the transmitted and received millimeter-wave data to the radar ECU 32. The radar ECU 32 acquires radar information based on the information from the radar 31, and transmits the radar information to the driver assist ECU 10. The radar information includes a distance to the target, an orientation of the target, a relative velocity of the target, and the like. Therefore, the radar information includes another vehicle information that specifies the location of the other vehicle with respect to the host vehicle, which is located in the obliquely forward region of the host vehicle.

The driver monitoring device (driver monitor) 40 acquires driver gaze information representing the state of the driver of the vehicle (including the facial direction of the driver with respect to the host vehicle and the gaze direction of the front face of the driver), and acquires the gaze direction in the left-right direction of the driver with respect to the front-rear axis of the host vehicle (hereinafter, referred to as the "pair front-rear axis gaze direction") and the gaze direction in the vertical direction of the driver (hereinafter, referred to as the "vertical gaze direction") based on the driver gaze information. The driver monitoring device 40 includes a driver monitor camera 41 and a driver monitor ECU 42. The driver monitoring device 40 is known per se and is disclosed, for example, in Japanese Unexamined Patent Application Publication Nos. 2019-87143 (JP 2019-87143 A), 2019-87029 (JP 2019-87029 A), 2016-38866 (JP 2016-38866 A), and 2013-152700 (JP 2013-152700 A).

The driver monitor camera 41 is disposed at an appropriate position in front of the driver's seat of the vehicle (for example, at an upper portion of the steering column). The driver monitor camera 41 captures an image of the driver's face every time a predetermined period of time elapses, generates face image data, and transmits the generated face image data to the driver monitor ECU 42.

The driver monitor ECU 42 generates a face image based on the face image data from the driver monitor camera 41, and rotates the generated face image. The driver monitor ECU 42 acquires the face orientation of the driver based on the rotation angle of the face image when the coincidence rate between the rotated face image and the previously stored "face shape data when the driver is facing the front" is maximized.

Further, the driver monitor ECU 42 identifies a face area from the generated face images of the driver, and detects the face part by extracting feature points of the face part such as the eye, the nose, and the mouth. Then, the driver monitor ECU 42 detects the position of the Purkinje image (corneal reflected image) and the position of the pupil center, and obtains the gaze direction with respect to the front of the face of the driver based on the positional relation between the Purkinje image and the pupil center. Thereafter, the driver monitor ECU 42 acquires the driver's pair longitudinal axis gaze direction and the vertical gaze direction based on the driver's facial direction and the gaze direction with respect to the direct front of the driver's face, and transmits the acquired information to the driver assist ECU 10.

The brake ECU 50 controls a braking device of a vehicle (not shown) by driving the brake actuator 51 based on the operation amount BP of the brake pedal detected by a brake pedal operation amount sensor 73 (described later). That is, the brake ECU 50 adjusts the braking force applied to the host vehicle so that the deceleration (the magnitude of the negative acceleration) of the host vehicle increases as the operation amount BP of the brake pedal increases. Further, the brake ECU 50 adjusts the braking force in response to an instruction from the driver assist ECU 10, and applies an automated brake to the host vehicle.

The warning ECU 60 causes the warning display device 61 to display a warning and causes the warning sound generation device 62 to generate a warning sound in response to an instruction (instruction signal) from the driver assist ECU 10. The warning ECU 60, the warning display device 61, and the warning sound generation device 62 are also referred to as a warning device or a warning device.

The driver assist ECU 10 receives the detected values (output values) of the following "sensors and switches".

An accelerator pedal operation amount sensor 71 that detects an operation amount AP of an accelerator pedal of the host vehicle.

The accelerator switch 72 outputs an ON signal when the accelerator pedal of the host vehicle is in a depressed state, and outputs an OFF signal when the accelerator pedal is in a released state.

The brake pedal operation amount sensor 73 detects the operation amount BP of the brake pedal of the host vehicle.

The brake switch 74 outputs an ON signal when the brake pedal of the host vehicle is in a depressed state and outputs an OFF signal when the brake pedal is in a released state.

A vehicle speed sensor 75 that detects the speed of the host vehicle (that is, the host vehicle speed Vh).

An acceleration sensor 76 for detecting an acceleration Gh of the host vehicle in the front-rear direction.

A steering angle sensor 77 for detecting a steering angle St of the host vehicle. The steering angle St becomes "0" when the steering wheel of the host vehicle (not shown) is in the neutral position.

Overview of Operation

The device DS determines whether there is another vehicle on the collision course based on at least the another vehicle information. When it is determined that there is another vehicle on the collision course, the device DS changes the execution condition of the collision avoidance assist operation for the another vehicle on the collision course on the basis of a determination result (approaching direction determination result) indicating whether the another vehicle is approaching the host vehicle from the "passenger seat side where the driver of the host vehicle is relatively easy to visually perceive the another vehicle" or the "driver seat side where the driver of the host vehicle is relatively difficult to visually perceive the another vehicle" on the basis of the determination result (approach direction determination result) indicating whether the another vehicle is approaching the host vehicle.

Further, the device DS determines whether the driver is highly likely to be visually perceiving another vehicle on the collision course based on the pair longitudinal axis gaze direction of the driver and whether a vehicle structure (for example, an A-pillar) is present in the pair longitudinal axis gaze direction of the driver, and changes the execution condition of the collision avoidance assist operation for the another vehicle based on the high/low probability (visual perception determination result) of the visually perceiving the another vehicle. In addition, the device DS determines whether the driver is executing a collision avoidance driving maneuver (e.g., a deceleration maneuver) for avoiding a collision with another vehicle on the collision course, and changes the execution condition of the collision avoidance assist operation for the other vehicle based on the presence or absence of the collision avoidance driving maneuver (driving maneuver determination result). As described above, the device DS changes the execution condition of the collision avoidance assist operation based on the approaching direction determination result, the visual perception determination result, and the driving maneuver determination result, and thereby changes the starting timing of the collision avoidance assist operation for the other vehicle on the collision course.

Specific Operation

Figure 3:
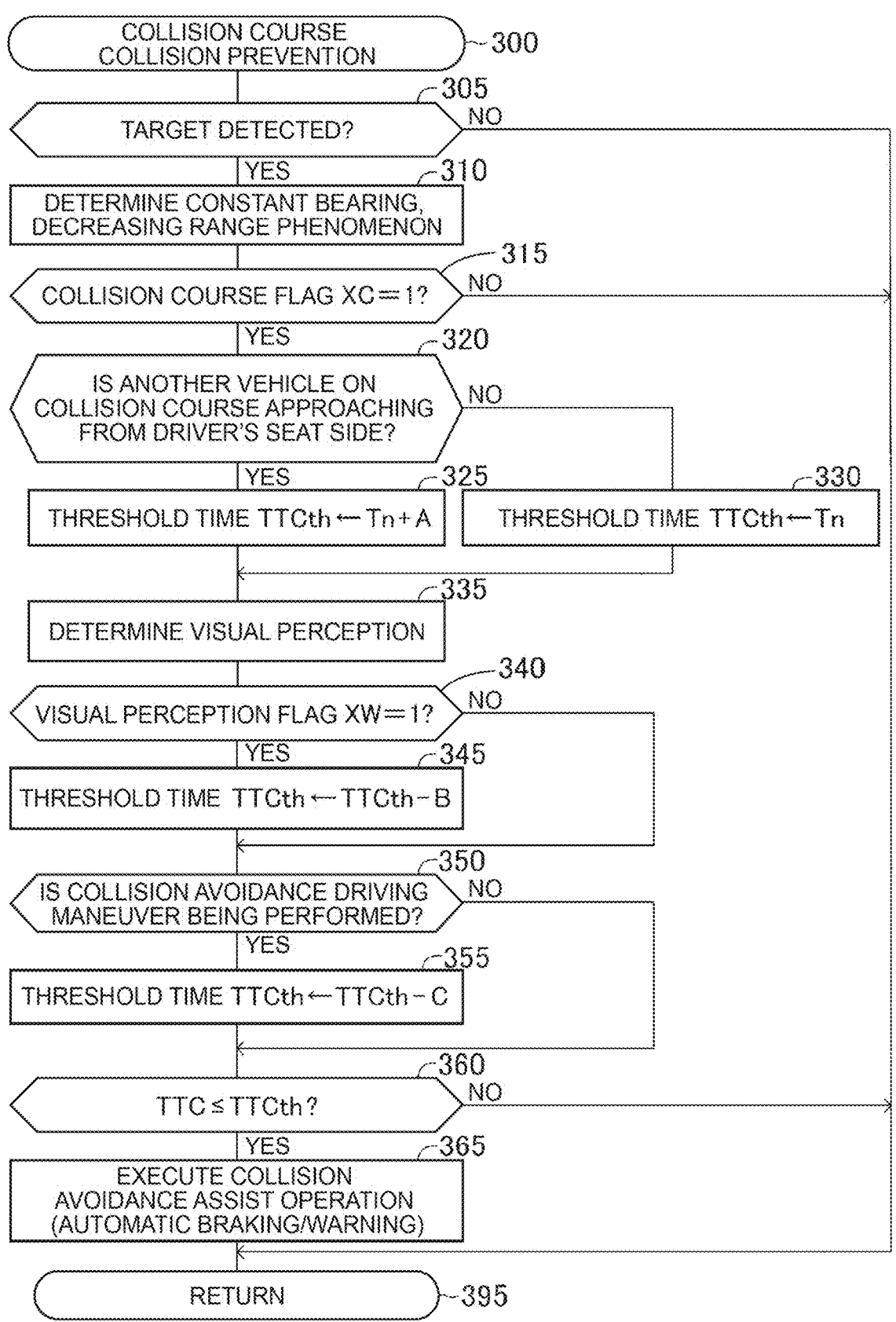
FIG. 3 is a routine executed by CPU of the driver assist ECU shown in FIG. 1.

In CPU of the driver assist ECU 10 (hereinafter, simply referred to as "CPU"), the routine illustrated by the flow chart in FIG. 3 is executed every predetermined period (calculation cycle) dt elapses.

When an appropriate time point has arrived, CPU starts the process from step 300 of FIG. 3 (hereinafter, the "step" is referred to as "S"), proceeds to S305, and determines whether a target is detected based on the camera information and the radar information. If no target is detected, CPU proceeds directly from S305 to S395 and terminates the routine once.

If a target is detected, CPU proceeds from S305 to S310 to determine whether the constant bearing, decreasing range phenomenon has occurred (whether there is another vehicle on the collision course), and sets the value of the collision course flag XC based on the determination result. The flag XC is set to "O" in an initialization routine executed by CPU when the ignition key switch of the host vehicle (not shown) is changed from the off position to the on position. The collision course flag XC indicates that the constant bearing, decreasing range phenomenon has occurred (there is another vehicle on a collision course) when the value is "1".

Figure 4:
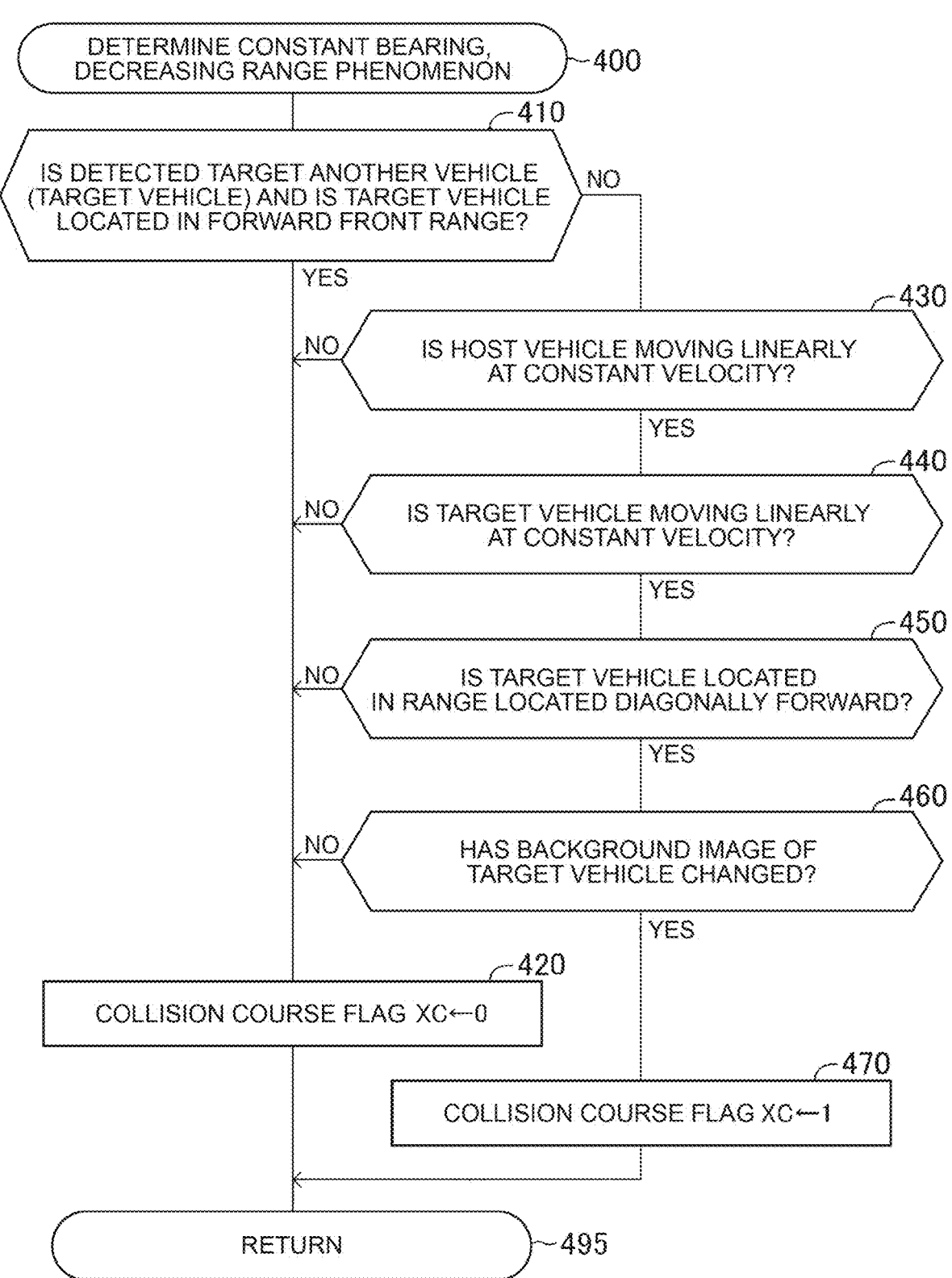
FIG. 4 is a routine executed by CPU of the driver assist ECU shown in FIG. 1.

More specifically, when CPU proceeds to S310, the process of the constant bearing, decreasing range phenomenon determination subroutine shown in FIG. 4 is started from S400 and proceeds to S410, and it is determined whether the detected target is another vehicle and the another vehicle (hereinafter, referred to as "target vehicle") is located within the direct front area of the host vehicle. The direct front area is a band-shaped area having a vehicle body width of the host vehicle set in a direction in which the host vehicle is estimated to travel.

When the target vehicle is located within the direct front range of the host vehicle, the constant bearing, decreasing range phenomenon does not occur. Then, CPU proceeds from S410 to S420, sets the collision course flag XC to "0", and then proceeds to S315 of FIG. 3 via S495.

On the other hand, when the target vehicle is not located within the direct front area of the host vehicle, CPU proceeds from S410 to S430 and determines whether the host vehicle is performing substantially constant velocity linear motion based on the host vehicle speed Vh, the acceleration Gh of the host vehicle, and the steering angle St. That is, when the vehicle speed Vh is larger than "0" and the magnitude of the acceleration Gh is smaller than the minute predetermined threshold Ghth and the magnitude of the steering angle St is smaller than the minute predetermined threshold Stth, CPU determines that the vehicle speed is substantially performing the constant velocity linear motion.

When the host vehicle is performing substantially constant velocity linear motion, CPU proceeds from S430 to S440, and acquires the location of the target vehicle with respect to the host vehicle at the current time point based on the host vehicle speed Vh, the steering angle St, the camera information, the radar information, and the like. Further, CPU determines whether the target vehicle is performing substantially constant velocity linear motion based on the history of the location of the target vehicle with respect to the host vehicle acquired in the past, the movement history of the host vehicle, and the location of the target vehicle with respect to the host vehicle at the current time (that is, temporal change of the absolute location of the target vehicle).

If the target vehicle is performing substantially constant velocity linear motion, CPU proceeds from S440 to S450 to determine whether the target vehicle is located within an obliquely forward range of the host vehicle. The forward diagonal direction range includes a range in which an angle from the front-rear axis to the right of the host vehicle is an angle from the first angle "θ1−α1" to the second angle "θ1+α1", and a range in which an angle from the front-rear axis to the left of the host vehicle is an angle from the third angle "θ2−α2" to the fourth angle "θ2+α2". Note that θ1 and θ2 may be equal to each other, for example, 45°. α1 and α2 may be equal to each other, for example 10°.

If the target vehicle is located within an oblique forward range of the host vehicle, CPU proceeds from S450 to S460 and determines, based on the camera-information, whether the background images of the target vehicle are changing over time. More specifically, CPU generates a frame in which the target vehicle is scaled to a certain size on the basis of the camera information, and determines whether an image (that is, a background image) other than the target vehicle in the frame changes over time.

For example, as shown in FIG. 2, when the another vehicle OV is traveling on the collision course, when the time t is t0, the background image of the another vehicle OV includes the building B1, but when the time t is t1, the background image of the another vehicle OV includes the building B2. In such cases, CPU determines that the background images have changed over time.

If "Yes" is determined in S430 to S450 steps and the background images change over time, it can be estimated that the constant bearing, decreasing range phenomenon has occurred. That is, it can be determined that the target vehicle is another vehicle on the collision course. Therefore, CPU proceeds from S460 to S470 and sets the collision course flag XC to "1". CPU then proceeds to S495 and then to S315 of FIG. 3.

If CPU determines "No" in any of the steps S430 to S460, the process proceeds from the step determined as "No" to S420, and proceeds to S315 of FIG. 3.

CPU proceeds to S315 of FIG. 3 to determine whether the collision course flag XC is "1". If the collision course flag XC is "0", CPU proceeds directly from S315 to S395. In this case, normal collision avoidance control (control for avoiding collision with a target located in the traveling direction of the host vehicle) is executed.

On the other hand, when the value of the collision course flag XC is "1", CPU proceeds from S315 to S320, and based on the camera information and the radar information, it is determined whether the another vehicle on the collision course is approaching from the driver's seat side (the right side if the vehicle is a right-handed vehicle) to the host vehicle (precisely, a point where the traveling direction of the host vehicle and the traveling direction of the another vehicle on the collision course intersect). The determination result of whether the other vehicle on the collision course is approaching the host vehicle from the driver's seat side or approaching the host vehicle from the passenger's seat side is also referred to as the approaching direction determination result.

For example, when the host vehicle is a right-handed vehicle, the distance between the driver's seat and the right-side A-pillar, which is a vehicle structure that blocks the driver's view, is shorter than the distance between the driver's seat and the left-side A-pillar, which is a vehicle structure that blocks the driver's view. Therefore, the view of the driver on the obliquely front right side is blocked over a relatively wide range with respect to the view of the obliquely front left side. Therefore, when the other vehicle on the collision course is approaching from the driver's seat side, the driver is more likely to be unaware of the other vehicle on the collision course than when the other vehicle on the collision course is approaching from the passenger's seat side. The same applies to the case where the host vehicle is a left-handed vehicle.

Therefore, when the another vehicle on the collision course is approaching from the driver's seat, CPU proceeds from S320 to S325 and sets a collision-time threshold TTCth to be described later to "a value obtained by adding a positive predetermined value A to the normal threshold Tn". As a result, the timing at which the collision avoidance assist operation described later is executed becomes relatively earlier. CPU then proceeds to S335.

On the other hand, when the other vehicle on the collision course is approaching from the passenger seat side, CPU proceeds from S320 to S330 and sets the collision-time threshold TTCth to the "normal threshold Tn". CPU then proceeds to S335.

When CPU proceeds to S335, it determines whether the driver has visually perceived another vehicle on the collision course (probability that the driver has visually perceived another vehicle on the collision course is high), and sets the value of the visual perception flag XW based on the result (visual perception determination result). The visual perception flag XW is set to "0" in the initialization routine described above. The visual perception flag XW indicates that the driver has visually perceived another vehicle on the collision course (probability that the driver has visually perceived another vehicle on the collision course is high) when the value is "1". Therefore, the visual perception flag XW indicates a determination result (visual perception determination result) as to whether the probability that the driver of the host vehicle has visually perceived another vehicle on the collision course is high.

More specifically, when CPU proceeds to S335, it starts the process of the visual perception determination subroutine shown in FIG. 5 from S500 and proceeds to S505, and determines whether the current time point is immediately after the time point at which the collision course flag XC changes from "0" to "1" (hereinafter, also referred to as "start time point of the constant bearing, decreasing range phenomenon").

If the current time point is immediately after the start time point of the constant bearing, decreasing range phenomenon, CPU proceeds from S505 to S510 and sets (resets) the timer Timer to "0". The timer Timer is a timer that measures the cumulative time of the condition in which the driver is presumed to be visually perceiving other vehicles on the collision course. Next, CPU proceeds to S515, sets the visual perception flag XW to "0", and then proceeds to S520. On the other hand, if the current time point is not immediately after the start time point of the constant bearing, decreasing range phenomenon, CPU proceeds directly from S505 to S520.

CPU acquires, in S520, a location (actually, an azimuth) of another vehicle on the collision course with respect to the host vehicle based on the camera information and the radar information.

Next, CPU acquires the pair longitudinal axis gaze direction and the vertical gaze direction from the driver monitoring device 40 in S525.

Next, CPU proceeds to S530 to determine whether the other vehicle on the collision course is located in the gaze direction range of the driver of the host vehicle (i.e., whether the driver is ready to view the other vehicle on the collision course).

More specifically, when both the following conditions 1 and 2 are satisfied, CPU determines that the other vehicle on the collision course is located in the gaze direction range of the driver of the host vehicle.

Figure 6A:
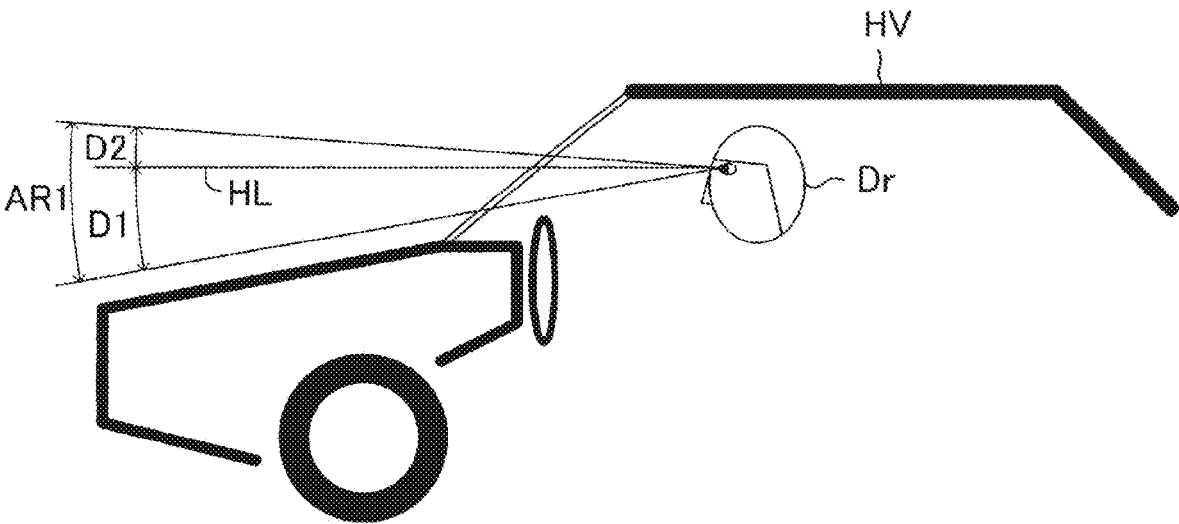
FIG. 6A is a diagram illustrating an example of a driver's gaze direction.

(Condition 1) The vertical gaze direction of the driver Dr of the host vehicle is within the first angle range AR1 when the driver Dr is looking at the outside of the host vehicle (see FIG. 6A). The first angle range is a range that is above the angle D1 from the horizontal direction HL to the lower side and below the angle D2 from the horizontal direction HL to the upper side.

Figure 6B:
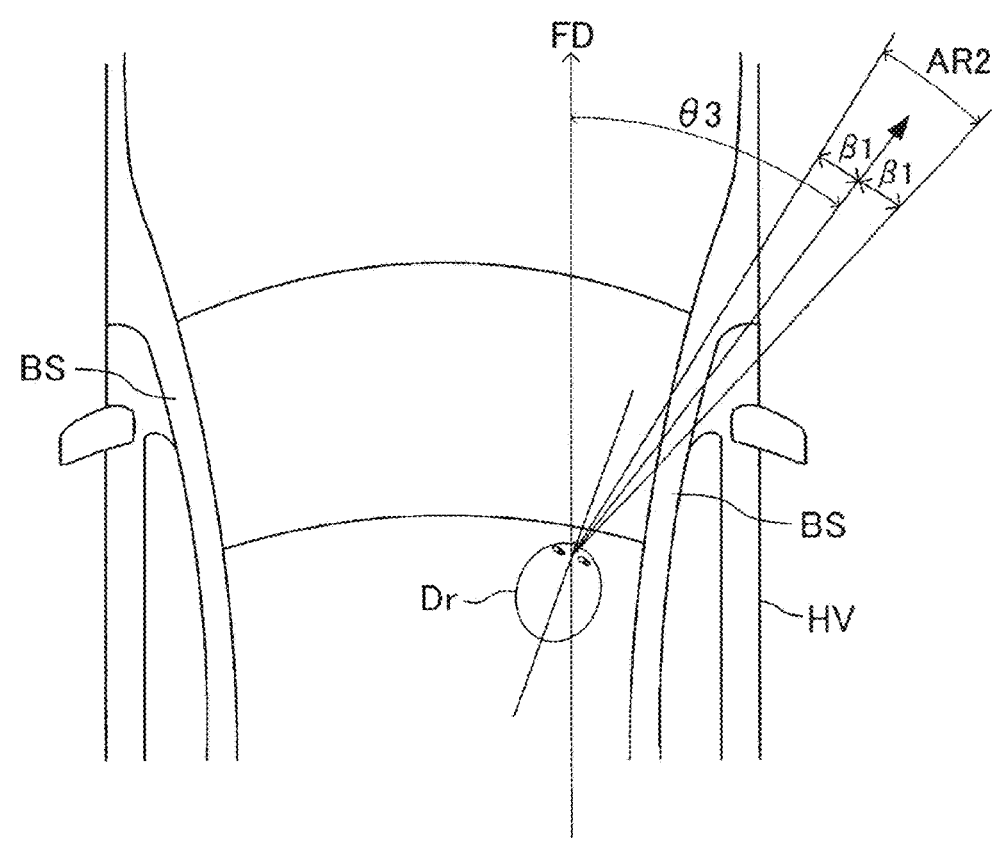
FIG. 6B shows another example of the driver's gaze direction.

(Condition 2) When the "angle (angle in the left-right direction) with respect to the front FD along the front-rear axis of the host vehicle HV" in the direction of the front-rear axis gaze direction of the driver Dr of the host vehicle is the angle $\theta3$, the another vehicle on the collision course is located within the second angle range AR2 (see FIG. 6B) from the angle "$\theta3-\beta1$" to the angle "$\theta3+\beta1$" in the angle from the front FD of the front-rear axis of the host vehicle to the left or right. $\beta1$ is, for example, 15°.

When the another vehicle on the collision course is located within the gaze direction range of the driver of the host vehicle, CPU proceeds from S530 to S535, and determines whether there is a "vehicle structure (shielding object) of the host vehicle" that blocks the driver's field of view within the gaze direction range of the driver of the host vehicle (second angle range AR2). A typical example of the vehicle structure of the host vehicle is an A-pillar (see the A-pillar BS shown in FIG. 6B).

Even if the another vehicle on the collision course is located within the gaze direction range (second angle range AR2) of the driver of the host vehicle, the driver of the host vehicle cannot see the another vehicle on the collision course as long as the vehicle structure of the host vehicle is located in the gaze direction range.

In other words, when "Yes" is determined in S530 and there is no "vehicle structure of the host vehicle" that blocks the driver's field of view in the gaze direction range (second angle range AR2) of the driver of the host vehicle, it can be estimated that the driver is looking at another vehicle on the collision course. Therefore, CPU proceeds from S535 to S540 and increases the timer Timer by a predetermined period (calculation period) dt. As can be seen from the above, the timer Timer does not increase when the driver of the host vehicle continues to look at a direction other than the other vehicle on the collision course. On the other hand, when the driver continues to watch other vehicles on the collision course or watches intermittently, the timer Timer gradually increases. Therefore, when the timer Timer is equal to or larger than the visual perception determination time threshold Tth, the driver of the host vehicle can estimate that the other vehicle on the collision course is visually perceived.

Therefore, when CPU proceeds from S540 to S545, it determines whether the timer Timer is equal to or larger than the visual perception determination time threshold Tth. If the value of the timer Timer is greater than or equal to the visual perception determination time threshold Tth, CPU proceeds from S545 to S550 and sets the value of the visual perception flag XW to "1". CPU then proceeds to S595 and then to S340 of FIG. 3.

If CPU determines "No" in any of the steps of S530, S535 and S545, the process proceeds directly from the step determined as "No" to S595, and then proceeds to S340 of FIG. 3. As described above, when the probability that the driver of the host vehicle has visually perceived another vehicle on a collision course is high, the value of the visual perception flag XW is set to "1", and otherwise, the value of the visual perception flag XW is set to "0".

When CPU proceeds to S340, it determines whether the visual perception flag XW is "1". If the value of the visual perception flag XW is "1", CPU proceeds from S340 to S345 and lowers the collision-time threshold TTCth by a positive predetermined value B. As a result, the timing at which the collision avoidance assist operation is executed is relatively slow. CPU then proceeds to S350. On the other hand, when the visual perception flag XW is not "1", CPU proceeds directly from S340 to S350.

CPU determines whether the driver of the host vehicle is executing a collision avoidance driving maneuver in S350. The determination result in this S350 is also referred to as a driving maneuver determination result. More specifically, when the signal from the brake switch 74 is the ON signal, CPU determines that the driver of the host vehicle is executing the collision avoidance driving maneuver. CPU may determine that the driver of the host vehicle is executing the collision avoidance driving maneuver in any of the cases described below (in a case where the driver of the host vehicle is executing the deceleration operation for decelerating the host vehicle).

When the signal from the accelerator switch 72 is an off signal.

When AP of accelerator pedals is decreasing over time.

When the operation amount BP of the brake pedal increases over time.

When the driver of the host vehicle is executing the collision avoidance driving maneuver, CPU proceeds from S350 to S355 and lowers the collision-time threshold TTCth by a positive predetermined value C. As a result, the timing at which the collision avoidance assist operation is executed is relatively slow. CPU then proceeds to S360. On the other hand, when the driver of the host vehicle is not executing the collision avoidance driving maneuver, the CPU proceeds directly from S350 to S360.

CPU determines whether a predetermined execution condition for executing a collision avoidance assist operation for avoiding collision with other vehicles on the collision course is satisfied in S360. More specifically, CPU determines in S360 whether the collision margin time Time To Collision (TTC) is equal to or less than the collision-time threshold TTCth. The collision margin time TTC is obtained by dividing the distance DP between the host vehicle and the point P at which the host vehicle and the other vehicle on the collision course intersect with each other by the vehicle speed Vh of the host vehicle (see FIG. 2).

When the collision margin time TTC is equal to or less than the collision-time threshold TTCth, the execution condition is satisfied. In this case, CPU proceeds from S360 to S365, and executes a collision avoidance assist operation (collision avoidance control/collision damage mitigation control). More specifically, CPU transmits an instruction signal to the brake ECU 50 to activate the brake actuator 51 to apply a braking force to the host vehicle so that the host vehicle is stopped in front of the point P intersecting the other vehicle on the collision course, thereby decelerating the host vehicle (to execute the automatic braking). Further, CPU transmits an instruction signal to the warning ECU 60, and causes the warning display device 61 to display a warning and causes the warning sound generation device 62 to generate a warning sound.

On the other hand, if the collision margin time TTC is greater than the collision-time threshold TTCth, CPU proceeds from S360 to S395 and terminates the routine once.

As described above, according to the embodiment of the present disclosure, since the execution condition (TTCth) of the collision avoidance assist operation is changed based on the approaching direction determination result, the visual perception determination result, and the driving maneuver determination result, the collision avoidance assist operation can be started at an appropriate timing.

The present disclosure is not limited to the above-described embodiments and modifications, and various modifications can be adopted within the scope of the present disclosure. For example, the device DS may change the execution condition of the collision avoidance assist operation based on at least one or any two of the approaching direction determination result, the visual perception determination result, and the driving maneuver determination result. That is, any one or any two processing groups among the processing groups of S320 to S330 in FIG. 3, the processing groups of S335 to S345 in FIG. 3, and the processing groups of S350 and S355 in FIG. 3 may be omitted. Here, the default value of the collision-time threshold TTCth is set to the normal threshold Tn.

Further, the collision start assisting operation does not include the automatic braking, and may be only the "warning and warning sound" or only the warning. Further, only the "warning and warning sound" may be executed when the collision margin time TTC becomes equal to or less than the first collision-time threshold TTCth1, and the "auto-braking" may be executed when the collision margin time TTC becomes equal to or less than the second collision-time threshold TTCth2 smaller than the first collision-time threshold TTCth1. In this case, each of the first collision-time threshold TTCth1 and the second collision-time threshold TTCth2 may be changed as described above based on at least one or any two of the approaching direction determination result, the visual perception determination result, and the driving maneuver determination result.

Further, for example, the present disclosure is applicable to a vehicle in which a driving mode is transitioned from automatic driving to driving by a driver in an automatic driving vehicle.

What is claimed is:

1. A driver assistance device for a vehicle, the driver assistance device comprising a controller configured to: acquire another vehicle information that is information on a location of another vehicle with respect to a host vehicle, the other vehicle being another vehicle present in a region located diagonally in front of the host vehicle; when determination is made based on the another vehicle information that there is another vehicle on a collision course, determine whether an executing condition for executing a collision avoidance assist operation for avoiding a collision between the host vehicle and the other vehicle on the collision course is satisfied, the other vehicle on the collision course being another vehicle traveling in such a manner that a constant bearing, decreasing range phenomenon occurs for the host vehicle; and when determination is made that the execution condition is satisfied, start execution of the collision avoidance assist operation, wherein the controller is configured to change the execution condition based on both of an approaching direction determination result as to whether the other vehicle on the collision course is approaching from a direction of a driver's seat of the host vehicle or is approaching from a direction of a passenger's seat of the host vehicle, and a visual perception determination result as to whether a probability that a driver of the host vehicle has visually perceived the other vehicle on the collision course is high, and the controller is further configured to when the other vehicle on the collision course is approaching from the direction of the driver's seat, change the execution condition in such a manner that a timing of starting the execution of the collision avoidance assist operation is earlier than when the other vehicle on the collision course is approaching from the direction of the passenger's seat, and when the probability that the driver has visually perceived the other vehicle on the collision course is low, change the execution condition in such a manner that the timing of starting the execution of the collision avoidance assist operation is earlier than when the probability that the driver has visually perceived the other vehicle on the collision course is high.

* * * * *